(12) United States Patent
Sugita

(10) Patent No.: US 6,430,158 B1
(45) Date of Patent: Aug. 6, 2002

(54) WIRELESS COMMUNICATION METHOD, WIRELESS COMMUNICATION APPARATUS AND WIRELESS COMMUNICATION CONTROL APPARATUS

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/232,635

(22) Filed: Jan. 19, 1999

(30) Foreign Application Priority Data

Jan. 23, 1998 (JP) .......................................... 10-011852

(51) Int. Cl.[7] .............................................. G01R 31/08
(52) U.S. Cl. ..................... 370/242; 370/243; 370/245; 370/241; 455/423; 455/424; 455/425
(58) Field of Search ................................. 455/67.4, 423, 455/424, 425; 370/252, 328, 329, 334, 345, 365, 445, 354, 356, 358, 224, 227, 449, 450, 241–245

(56) References Cited

U.S. PATENT DOCUMENTS

| | | | | |
|---|---|---|---|---|
| 4,745,593 A | * | 5/1988 | Stewart | 370/15 |
| 4,930,118 A | * | 5/1990 | Sugihara | 370/16 |
| 4,987,571 A | * | 1/1991 | Haymond et al. | 370/85 |
| 5,404,572 A | * | 4/1995 | Ishii | 455/67.4 |
| 5,521,904 A | * | 5/1996 | Eriksson et al. | 370/15 |
| 5,784,406 A | * | 7/1998 | DeJaco et al. | 375/224 |
| 5,987,320 A | * | 11/1999 | Bobick | 455/423 |

* cited by examiner

*Primary Examiner*—Daniel Hunter
*Assistant Examiner*—Tuan Tran
(74) *Attorney, Agent, or Firm*—Jay H. Maioli

(57) ABSTRACT

A method and apparatus for ensuring wireless transmission among respective communicating apparatuses when constructing a local area network with a plurality of wireless communicating apparatuses. Under the control of a control station (10), a wireless signal of a frame structure is transmitted between communicating stations (20) and (30). The wireless signal of a frame structure has a managing region and a data transmitting region. In the managing region, a test signal for checking quality of communication among a plurality of communicating stations and communication quality information representative of quality of communication among the plurality of communicating stations are transmitted. In the data transmitting region, isochronous data or asynchronous data is transmitted under the access control of the control station.

11 Claims, 11 Drawing Sheets

FIG. 5A Frame Structure

FIG. 5B Managing Region Structure

FIG. 5C Test Signal Test Result Information

FIG. 5D Data Transmitting Region Structure

FIG. 8

| WN1 | | | | | | |
|---|---|---|---|---|---|---|
| 1 | WN2 | | | | | |
| 1 | 0 | WN3 | | | | |
| 1 | 1 | 1 | WN4 | | | |
| 0 | 0 | 1 | 1 | WN5 | | |
| 0 | 0 | 0 | 1 | 1 | WN6 | |
| 0 | 0 | 1 | 1 | 1 | 0 | WN7 |

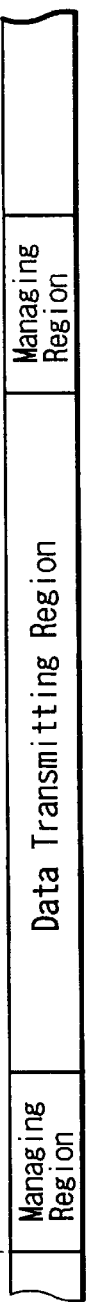
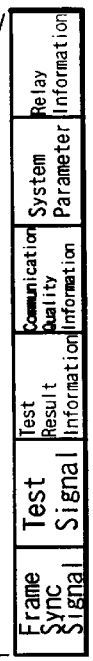
FIG. 10A Frame Structure
FIG. 10B Managing Region Structure

WIRELESS COMMUNICATION METHOD, WIRELESS COMMUNICATION APPARATUS AND WIRELESS COMMUNICATION CONTROL APPARATUS

BACKGROUND OF THE INVENTION

1. Field of the Invention

The present invention relates to a wireless communication method which is suitable for constructing a local area network (LAN) among a plurality of equipments, where various information is transmitted by e.g. a wireless signal, as well as a wireless communicating apparatus and a wireless communication control apparatus to which the wireless communication method is applied.

2. Description of the Related Art

When a local area network is constructed within a comparatively narrow area such as a household, an office or the like so that, among the plurality of equipments such as various video equipments, personal computers, its circumferential devices, and so on transmission of data which is handled by those equipments can be performed, a wireless transmitting/receiving apparatus may be connected to each of these equipments for allowing the data transmission to be performed by wireless instead of making direct connection among those equipments by some signal lines.

Constructing the local area network by wireless transmission enables a system configuration to be simple without any need to directly connect each equipment by signal lines and the like.

Incidentally, when three or more wireless transmitting receiving apparatus (communicating apparatus) are provided to construct the local area network, the CSMA (Carrier Sense Multiple Access) method or the polling method has heretofore been employed in general as an access method.

In case of the CSMA method, transmitting data containing a sender's address and a receiver's address is processed to be transmitted to all other communicating apparatus within that network. On a receiving side, if received data is decided to be those addressed to one's own station from judging the receiver's address contained in transmitted data, the data is processed to be acquired. In case of the polling method, a control station for controlling the communication is provided and the control station inquires from each communicating apparatus if any transmitting data is present. If the transmitting data is present, the control station gives a transmitting right to a corresponding communicating apparatus allowing it to perform the communication.

In any conventional communication method, the communicating apparatus side which intends to transmit data may transmit without knowing whether or not a receiving side can receive a wirelessly transmitted data and if the receiving side is unable to receive, wireless resources will be wasted. Moreover, a problem has been raised in which each communicating apparatus cannot estimate the quality of a communication with a communicating companion and so it cannot determine in what conditions data should be transmitted.

Accordingly, when the local area network was constructed for making the wireless transmission in the past, the companions with whom each wireless communicating apparatus can communicate were limited to those located within such a near distance that data can securely be transmitted wirelessly. Thus, in case of the system by wireless, it was possible to construct the local area network within very narrow area only.

Particularly, in recent years, data to be wirelessly transmitted through such a local area network involves many data which require a very large transmitting capacity (e.g. several Mbps to dozens Mbps or so ) such as video signal made into digital data, various program data for computer and the like. In order to ensure the transmitting capacity which is enough to process such data, it is necessary to utilize a very high transmitting band (e.g. about 5 $GH_z$). On the other hand, the wireless communicating apparatus for constructing the local area network is limited in its transmitting output and so in case of the apparatus which can be installed without permission, a wirelessly transmissible distance will become a very short distance (e.g. from several meters to dozens meters or so), so that if a distance between the wireless communicating apparatus exceeds the distance allowing the wireless transmission, the receiving side cannot process to receive data correctly.

SUMMARY OF THE INVENTION

In view of the foregoing points, an object of the present invention is to ensure the wireless transmission among respective communicating apparatuses when constructing the local area network with a plurality of wireless communicating apparatuses.

According to an aspect of the present invention, there is provided a wireless communication method, in which a wireless signal having a frame structure is transmitted by wireless communication under the control of a control station, the frame structure of the wireless signal includes a managing region and a data transmitting region. In the managing region, transmitted are a test signal for checking the quality of communication among a plurality of communicating stations and communication quality information representative of the quality of communication among the plurality of communicating stations. In the data transmitting field, isochronous data or asynchronous data is transmitted under the access control of the control station.

According to the wireless communication method of the present invention, each communicating station can know the quality of communication with other communicating station within the system by receiving the test signal, the communication quality information among the respective communicating stations is produced on the basis of the quality of information, and then the quality information is transmitted to each communicating station, so that each communicating station can estimate conditions of communication within the system.

There is provided a wireless communicating apparatus according to another aspect of the present invention, which comprises a controller unit for controlling the communication in a frame cycle established by a control apparatus for making the access control and a communication processor unit for transmitting or receiving, under the control of the controller, in the managing region established in a first timing section within the frame cycle, the test signal for checking the quality of communication with other wireless communicating apparatus and a test result based on the test signal.

According to the wireless communicating apparatus of the present invention, the wireless communication with other wireless communicating apparatuses is made in the frame cycle and, in the managing region within the frame cycle, the quality of communication with other wireless communicating apparatuses can be checked based on the test signal. The checked test result can also be transmitted to the control apparatus and the like.

Moreover, the wireless communication control apparatus according to the present invention comprises a controller unit for making communication among a plurality of wireless communicating apparatuses to be performed in a frame cycle, establishing a managing field in a region timing section within the frame cycle and establishing a data transmitting region in a second timing, a receiver unit for receiving in the managing region, information which is transmitted from each of the wireless communicating apparatuses and is representative of a test result of conditions of communication with other wireless communicating apparatuses, and a transmitter unit for producing communication quality information from a result of decision by the controller unit deciding the received information representative of the test result and transmitting the produced communication quality information on the managing region.

According to a further aspect of the present invention, there is provided a wireless communication control apparatus. In the managing region within the frame cycle, the communication quality information representative of conditions of communication among the wireless communication apparatuses under the wireless communication control of the control apparatus is transmitted, and each of the wireless communication apparatuses can grasp conditions of communication within the communication network.

BRIEF DESCRIPTION OF THE DRAWINGS

FIG. 8 is an explanatory diagram showing an example of totaling the test results according to the first embodiment of the present invention;

FIGS. 10A and 10B are each an explanatory diagram showing the frame structure of the transmitting signal according to the second embodiment of the present invention;

DESCRIPTION OF THE PREFERRED EMBODIMENTS

A first embodiment according to the present invention will now be described below with reference to FIG. 1 to FIG. 8.

Figure 3:
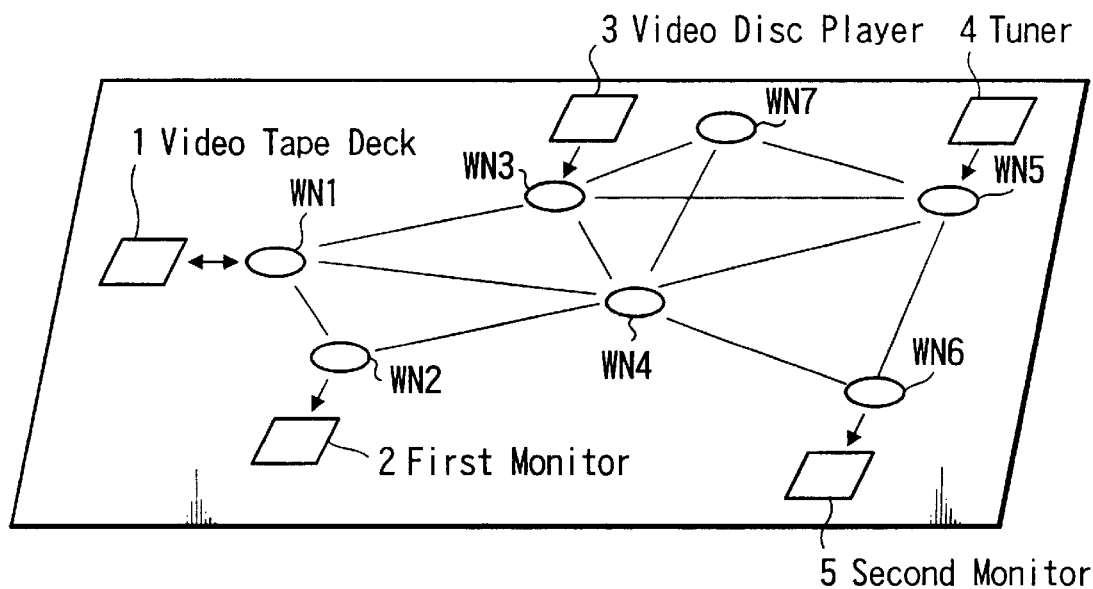
FIG. 3 is an explanatory diagram showing an example of the system configuration according to the first embodiment of the present invention.

The present example is such that the present invention is applied to a system for transmitting and receiving video data or computer data or the like in a household and the like. A system configuration of a network according to the present example will be described first with reference to FIG. 3. In this case, as is shown in FIG. 3, a plurality (seven in this example) of wireless nodes WN1, WN2, . . . , WN7 are arranged in a given area within the household. Each of the wireless node WN1, WN2, . . . , WN7 forms a wireless communication apparatus for transmitting and receiving wireless signals. A video tape deck 1 is connected to ski the wireless node WN1. A first monitor, or video receiver 2 is connected to the wireless node WN2. A video disc player 3 is connected to the wireless node WN3. A tuner 4 is connected to the wireless node WN5. A second monitor, or video receiver 5 is connected to the wireless node WN6. To the wireless nodes WN4 and WN7 is connected no particular equipment. In FIG. 3, when the wireless transmission is possible among respective nodes, those nodes are connected by a line as shown. Between nodes which are not connected directly by a line no direct wireless transmission is allowed due to a long transmission distance and the like.

Figure 4:
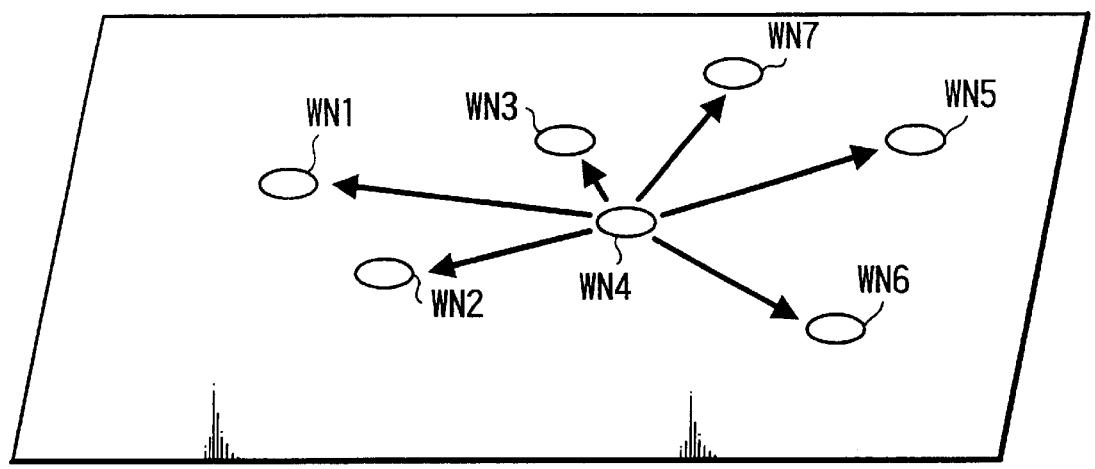
FIG. 4 is an explanatory diagram showing an example of control according to the first embodiment of the present invention.

In the present example, one of the seven wireless nodes WN1 to WN7 is established to be a control station. The wireless node established as the control station is in principle such one that is arranged at a position which allows a direct communication with all other wireless nodes within the system. In case of the example shown in FIG. 3, the wireless node WN4 which is positioned nearly at the center is established as the control station. As is shown in FIG. 4, it is arranged that the direct wireless transmission of control signals can be made from the wireless node WN4 to all other wireless nodes WN1 to WN3, WN5 to WN7 and data transmission between the respective nodes is performed by a command based on the control signal from the control station WN4. An individual address is assigned beforehand to each of the wireless nodes WN1 to WN7 (or the address may be determined under the control of the control station). These addresses are used to specify senders, destinations and the like of transmitted data.

For the wirelessly transmitted data by the system of the present example, two kinds of data are prepared, i.e. so-called asynchronous data which is transmitted asynchronously and so-called isochronous data which is transmitted continuously. Comparatively short data such as various control commands of computer, etc. are transmitted as the asynchronous data. Comparatively large capacity of data such as video data and audio data are transmitted as the isochronous data.

The thus configured system enables various data such as video data or the like to be transmitted among the equipments 1 to 5 connected to the associated nodes.

Figure 1:
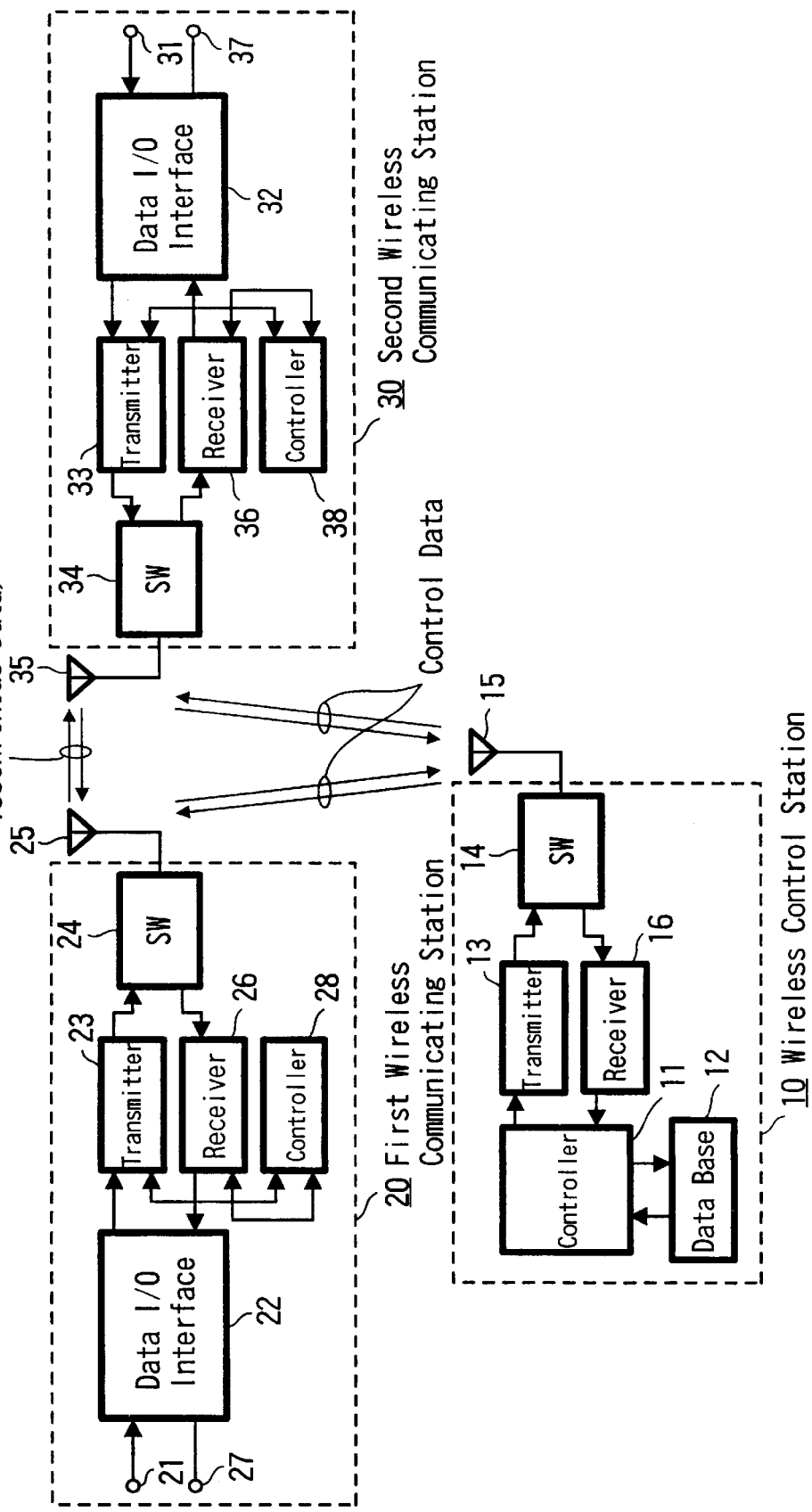
FIG. 1 is a block diagram showing the configuration of each communicating station and a control station according to a first embodiment of the present invention.

Next, referring to FIG. 1, a specific configuration of the wireless communication apparatus forming each node will be described. To simplify the description, FIG. 1 shows two nodes (wireless communication apparatus) for performing data transmission by wireless and a node (wireless communication control apparatus) for controlling communications between these two nodes. In this example, the node for controlling communications is shown as a wireless control station 10 and the two nodes for performing data transmission are shown as a first wireless communicating station 20 and a second wireless communicating station 30.

The wireless control station 10 comprises a controller 11 to perform the communication control processing. A data base 12 storing data to be used for control by the controller 11 is connected to the controller 11. A control signal produced by the controller 11 is supplied to a transmitter 13 which processes it for transmission. Then, the control signal processed for transmission is supplied to an antenna 15 through a change-over switch 14 and transmitted by wireless from the antenna 15. Control signals transmitted to the control station from other stations such as the wireless communication stations 20 and 30 are received by the antenna 15 and supplied through the change-over switch 14 to a receiver 16 which operates to demodulate the received signal and supplies the received signal demodulated to the controller 11.

The first and second wireless communicating stations 20 and 330 are of an identical configuration and have data input-output interface units 22 and 32, respectively. The interface units 22, 32 process received data at input terminals 21, 31 to convert the same into transmitting data in the respective interfaces units 22, 32 and supplies the processed data to a transmitters 23, 33 which process the same the same to make transmitting signals. The transmitting signals are supplied through change-over switches 24, 34 to antennae 25, 35 from which the transmitting signals are transmitted by wireless.

Wireless signals received by the antennae 25, 35 are supplied through the change-over switches 24, 34, to the receivers 26, 36 which process to demodulate the same into received data. The received data are supplied to the data I/O interface units 22, 32 which convert the same into serial data, etc. of a predetermined format for outputting them from output terminals 27, 37. In this case, the transmissive processing by the transmitters 23, 33 and the receptive processing by the receivers 26, 36 are arranged to be controlled by controllers 28, 38 included in each of the wireless communicating stations 20, 30. When the signals received by the receivers 26, 36 are a control signal, it is supplied to the controllers 28, 38 which decides the control information to control into its corresponding condition. Further, when the control information is required to be transmitted to other station such as the control station or the like, the controllers 28, 38 supply the control information to the transmitters 23, 33 for transmitting the same by wireless.

In addition, while this example is arranged so that the antennae 15, 25, 35 of respective stations are connected to the transmitter/receiver circuits through the change-over switches 14, 24, 34 and the transmission/reception are performed on time division method, the antenna and the transmitter/receiver circuits may be connected through those other than the switch.

Figure 2:
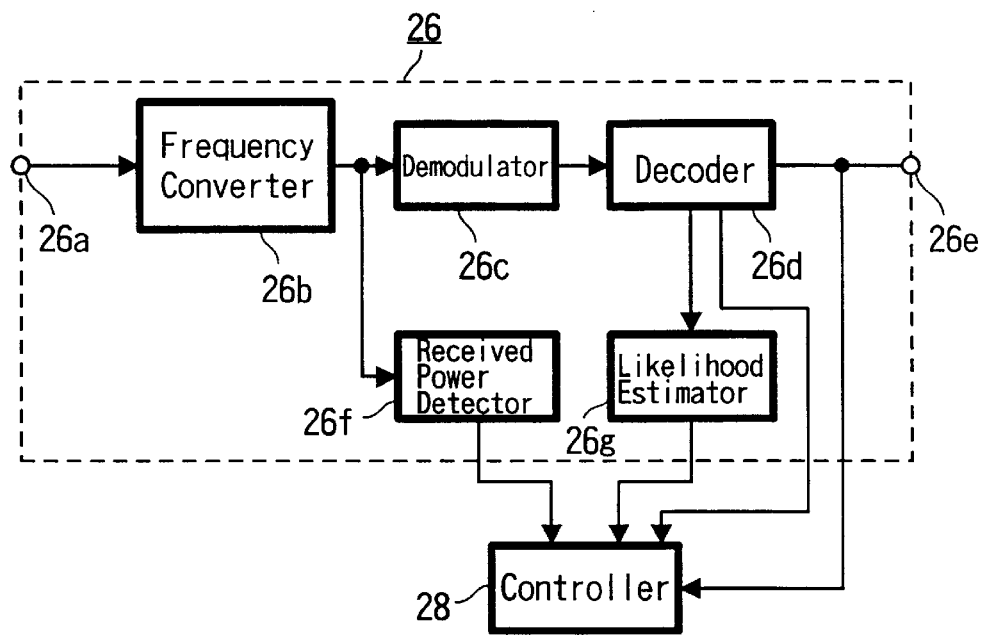
FIG. 2 is a block diagram showing an example of the configuration of a receiver unit according to the first embodiment of the present invention.

Moreover, the receivers 16, 26, 36 included in the control station 10 and each of the wireless communicating stations 20, 30 each have an arrangement for detecting receptive conditions. Specifically, as shown in FIG. 2, the receiver 26 of the first wireless communicating station 20 is arranged so that a received signal of a given frequency supplied from the antenna side through a terminal 26a is converted into an intermediate frequency signal (or a base band signal) by a frequency converter unit 26b and the converted signal is supplied to a demodulator unit 26c which processes to demodulate it. The thus demodulated signal by the demodulator unit 26c is supplied to a decoder unit 26d which operates to decode the transmitted data. The decoded data is supplied from an output terminal 26e to a subsequent stage circuit (interface unit 22) and also supplied to the controller unit 28. The decoder unit 26d performs a decoding processing matched to an encoding system on the transmitted signal, the Viterbi decoding processing in this case. Furthermore, the decoder unit 26d performs an error correcting processing using an error correction code or the like added to the transmitted signal.

In this example, the intermediate frequency signal (or the base band signal) which is frequency-converted by the frequency converter unit 26b is supplied to a received power detector unit 26f which detects a received power (level) of that signal. Data of the received power detected is supplied to the controller unit 28. The likelihood (degree of certainty on information) when the decoder unit 26d performs the Viterbi decoding is estimated by a likelihood estimator unit 26g. Data of the estimated likelihood is then supplied to the controller unit 28. Further, an error correction rate when the decoder unit 26d performs the error correction is produced within the decoder unit 26d. Data of that error correction rate (i.e. data indicating a degree of error of received data) is also supplied to the controller unit 28.

The controller unit 28 decides the receptive condition on the basis of data of the received power, data of the likelihood and data of the error correction rate which are supplied thereto. The deciding of the receptive condition is performed when the below described test signal is transmitted at a timing controlled by the control station and as to whether or not the condition is such that signals can correctly be received. From data of the decided receptive condition, the controller unit operates to produce a test result data. The test result data produced is supplied to the transmitter unit 23 at a predetermined timing and then transmitted to the control station side by wireless. The processing to transmit the test result data by wireless will be described below.

Concerning other stations 10 and 30, the receivers 16, 36 each have the same configuration and the controller 11, 38 in the respective stations operates to produce the test result data on the basis of the receptive condition data supplied thereto. The second wireless communicating station 30 transmits wirelessly the produced test result data to the control station 10 in the same way as the first wireless communicating station 20, whereas the wireless control station 10 stores the produced test result data in the data base 12 of the control station 10. The test result data transmitted wirelessly from each station to the wireless control station 10 are also stored in the data base 12. On this occasion, under the control of controller unit 11 within the wireless control station 10, the test result data from each station are summed up and stored in the data base 12 as a data indicating conditions of communication among the stations within the network forming the system of this example.

Further, in this example, the wireless control station 10 is shown as a station which controls the communication only, but the wireless control station 10 may be provided with the I/O interface which transmits data supplied from the equipments connected thereto and supplies received data to the equipments connected thereto in order to make it possible to transmit and receive the asynchronous data or the isochronous data.

Figure 5:
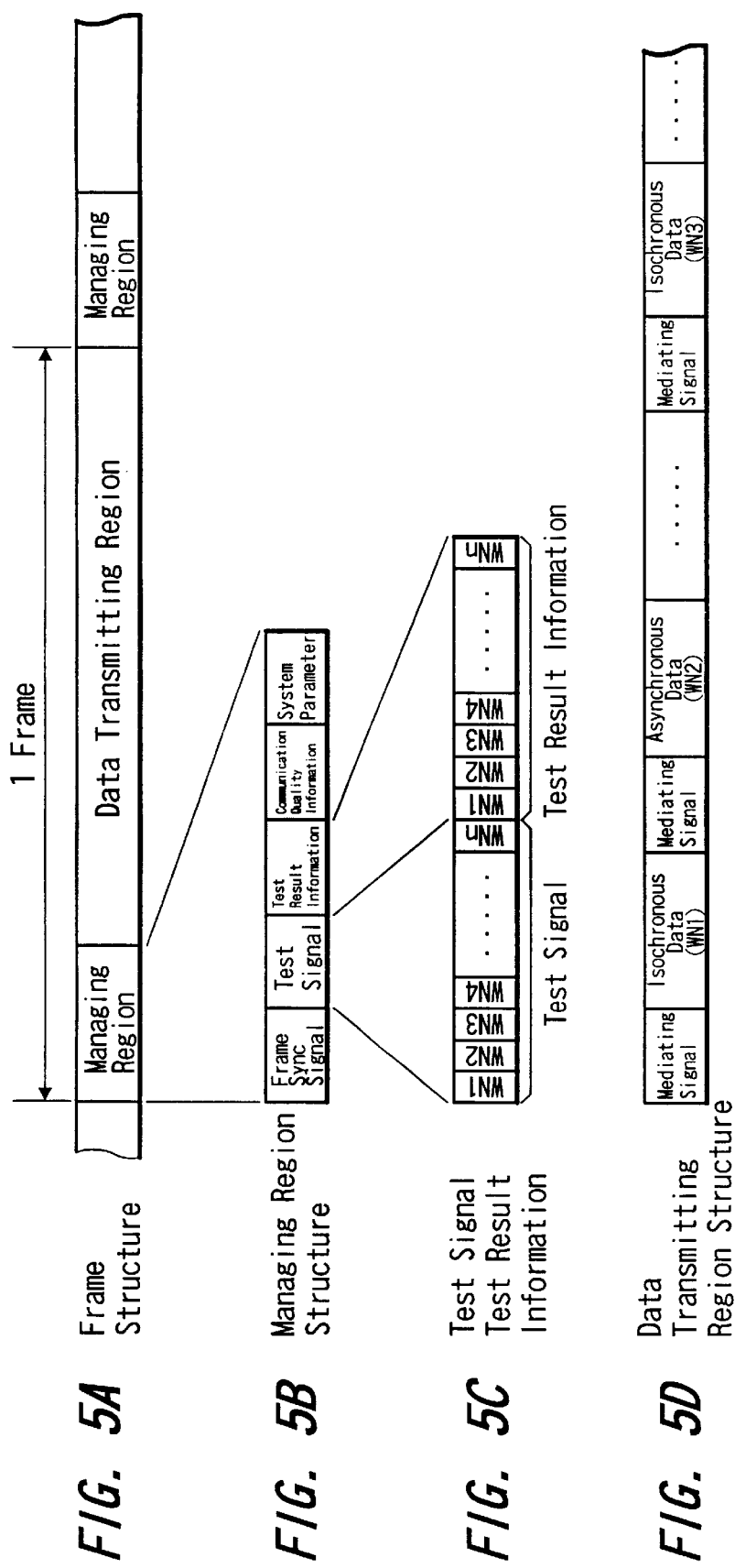
FIGS. 5A to 5D are each an explanatory diagram showing the frame structure of the transmitting signal according to the first embodiment of the present invention.

The wireless transmission of the data (asynchronous data or isochronous data) between the first wireless communicating station 20 and the second wireless communicating station 30 which are configured in this manner is performed under the control of the wireless control station 10. Describing below the wireless transmission processing under the control of the wireless control station 10, first of all, signals transmitted on the system of this example are defined to be those having a frame structure in which a frame is repeated in a predetermined cycle, the cycle of the frame being established under the control of the control station 10. FIG. 5 shows the frame structure established in the system of this example. As is shown in FIG. 5A, a managing region is provided at the head of one frame and the remaining section is used as a data transmitting region.

FIG. 5B shows details of the managing region where a frame synchronizing signal, a test signal, test result information, communication quality information and a system parameter are transmitted in this order from the head portion. In this case, the frame synchronizing signal, the communication quality information and the system parameter are signals transmitted from the wireless control station 10. Each wireless communicating station receives the frame synchronizing signal to decide the frame cycle.

In sections of the test signal and the test result information, corresponding signals are transmitted in a predetermined order from other wireless communicating stations. In this regard, when the maximum number of the communicating stations which can be installed within the network system of this example is n (n: an arbitrary integer), a section of the test signal and a section of the test result information are each divided into n parts respectively, as shown in FIG. 5C. The divided respective parts are assigned to respective stations existing in the system network. In case of the present example, because it is the system whose network is comprised of seven stations WN1 to WN7 as shown in FIG. 3, n is set seven or more. Thus, at least these seven stations WN1 to WN7 have the test signal section and the test result information section assigned to them.

In the test signal section assigned to each communicating station, the transmitter unit of that station operates to transmit the predetermined test signal for transmitting the test signal by wireless. On this occasion, transmission requirements such as transmitting power of the test signal from each station are basically established to be equal. Contents (information) of transmitted signals may be the same for each station, or it may be such information that respective station addresses are added for each station.

The test signal transmitted from each communicating station is received and processed by all other communicating stations within the system, which decide the receptive conditions based on data of the received-power, the likelihood and the error correction rate at that time. In this case, because a timing for transmitting the test signal is assigned in turn to each communicating station within the system, the receptive conditions decided by each communicating station will determine whether or not receptive conditions of signals from all other communicating stations within the system are correctly receivable conditions, and on the basis of a result of the determination the test result data is produced.

Subsequently, the test result data produced at each communicating station is transmitted by wireless on the test result information section assigned to each communicating station and the test result information is received by the control station. When receiving the test result information from each communicating station, the control station sums up the test result information from each station to produce the communication quality information within the network. FIG. 8 shows an example of summing up the communication quality information, in which "1" data shows that a direct communication among the stations is possible and "0" data shows that the direct communication among the stations is impossible. The example shown in FIG. 8 corresponds to the example of network configuration shown in FIG. 3. In other words, when the nodes connected by a straight line among the nodes WN1 to WN7 can make the direct with one another as shown in FIG. 3, the data in these sections become "1" data and the data in other sections become "0" data.

Further, in the example of FIG. 8, on the assumption that transmissive conditions from one station to the other station is equal to transmissive conditions from the other station to the one station, transmissive conditions between the two stations is indicated by one data, whereas if transmitting power of each station is different, the transmissive conditions from one station to the other station and the transmissive conditions from the other station to the one station may be indicated by separate data to be totaled.

Returning again to the description of FIG. 5, the thus totaled communication quality information by the control station is wirelessly transmitted to all communicating stations within the system on the communication quality information section of the managing region shown in FIG. 5B. The communicating stations other than the control station within the system store the communication quality information in a memory of the controller unit and use the stored data when determining the station to which the direct transmission can be made from one's own station.

On the system parameter section, the control station transmits information on various parameters of the network system to each station. When receiving these system parameters, the communicating stations except the control station cause its controller unit to set various items indicated by those parameters in the corresponding states.

When the so far described managing region has finished, the remaining section within the frame goes to the data transmitting region. In this data transmitting region, transmission of the data (asynchronous data or isochronous data) among the communicating stations is performed under the control of the control station. In case of this example, supposing that the communication among the respective stations takes place under the polling control of the control station, the control station transmits first a mediating signal for calling each station in turn as shown in D of FIG. 5. If the communicating station of an address specified by the mediating signal has any data to be transmitted to other station, the control station operates to transmit that data. If there is no data to be transmitted or the asynchronous data has been transmitted, the control station transmits the mediating signal for calling another station of next address and causes each communicating station to transmit data sequentially. Moreover, if the data to be transmitted from each communicating station is the isochronous data such as video data or the like, the control station causes transmission of that isochronous data to be temporarily interrupted and transmits the mediating signal so that transmission of the asynchronous data from other station can cut in. Such processing of data transmission is repeated as long as the data transmitting region continues. When the managing region of next frame is entered, the processing of data transmission is interrupted to perform the aforesaid processing in the managing region, and when the data transmitting field of the frame is entered, the processing of data transmission is resumed. In addition, for the transmission method of the intermixed isochronous data and asynchronous data, the communication method, e.g. prescribed as IEEE 1394 is known.

Figure 6:
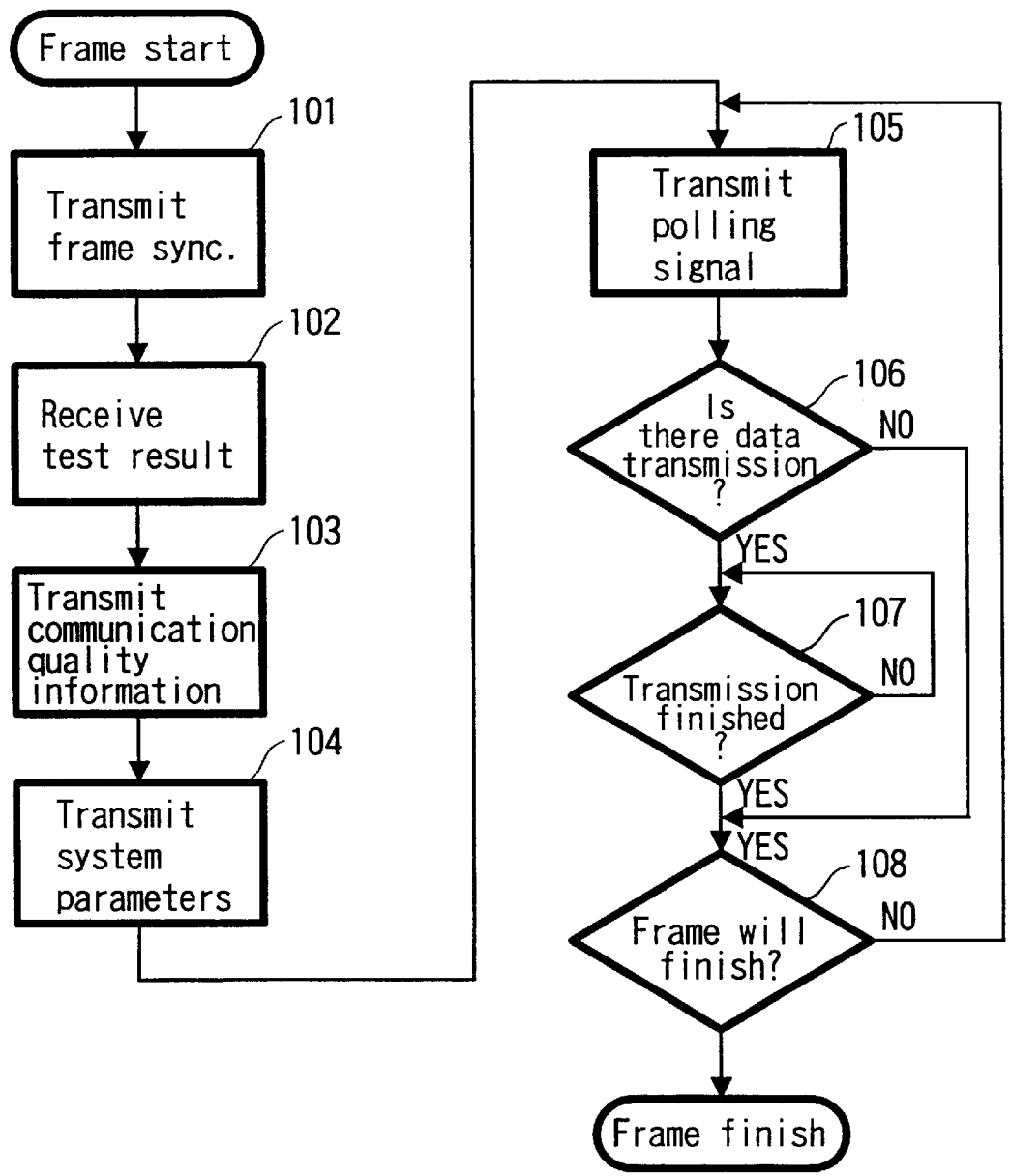
FIG. 6 is a flow chart showing the processings in the control station according to the first embodiment of the present invention.
Figure 7:
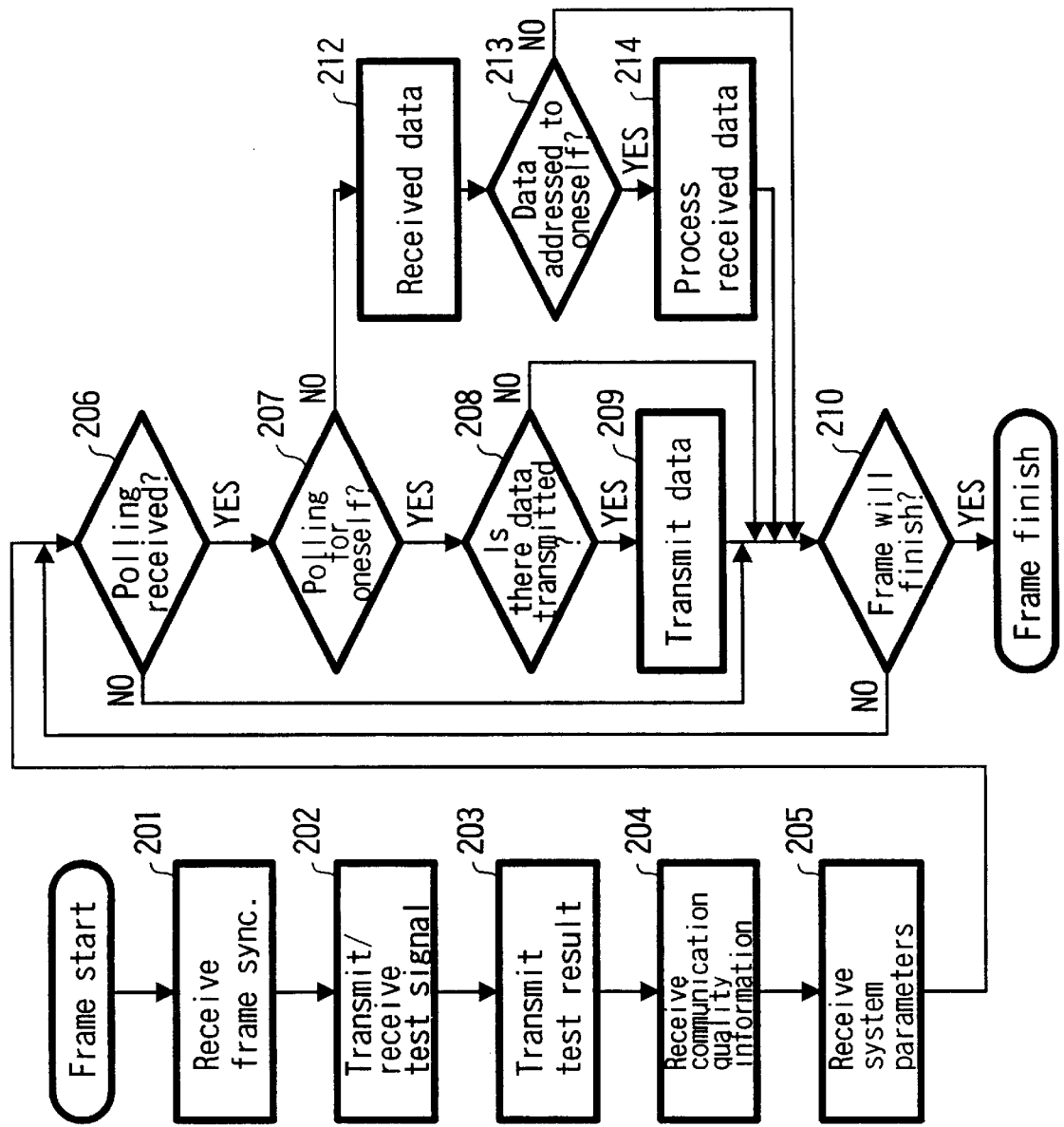
FIG. 7 is a flow chart showing the processings in the communicating station according to the first embodiment of the present invention.

Next, the processings of the control station and the processings of the communicating station performed in every frame cycle under the frame structure of the present example will now be described with reference to flow charts of FIG. 6 and FIG. 7. The processings performed by the control station will be described first based on the flow chart of FIG. 6. At the head of one frame, the control station performs the transmissive processing of the frame synchronizing signal (step 101). The control station waits during the test signal section, i.e. a section next to the frame synchronizing signal section, receives the test result information transmitted during next test result information section (step 102), sums up the received test result information to produce the communication quality information and transmits the produced communication quality information (step 103). Next, the transmissive processing of system parameters is performed during the system parameter section (step 104) and processings in the managing region will finish.

When the data transmitting region is entered, the control station operates to transmit the polling signal (mediating signal) for calling each communicating station in turn (step 105) and decides by transmitting the polling signal whether or not there is data transmission from the relevant station (step 106). If there is the data transmission, the control station decides whether that data transmission has been completed or not (step 107). If that data transmission has been completed or it is decided that there is no data transmission at step 106, it is decided whether the data transmitting region of this frame will finish or not (step 108). If the data transmitting region will not finish, the step returns to step 105 and the polling signal is transmitted to next station. If it is decided that the data transmitting region of the frame will finish at step 108, processings of this frame are finished and processings of next frame will be repeated from step 101.

Referring to the flow chart of FIG. 7, processings performed in each frame by the communicating station will be described. When receiving the frame synchronizing signal (step 201), the communicating station operates to transmit and receive the test signal at a timing established by the frame synchronizing signal (step 202) and then operates to transmit the test result information i.e. a result of receiving the test signal (step 203). Subsequently, an operation to receive the communication quality information is performed during the section where the communication quality information is transmitted (step 204) and then an operation to receive the system parameters is performed during the section where the system parameters are transmitted (step 205). Next, it is decided whether the polling signal is received or not (step 206). If the polling signal is received, then it is decided whether or not the polling signal is addressed to one's own station (step 207). If it is addressed to his own station, then it is decided whether or not there is any data to be transmitted from his own station (step 208). If there is data to be transmitted, an operation to transmit the data will be performed (step 209).

If it is decided that the polling signal is not addressed to his own station at step 207, the communicating station receives data transmitted from each communicating station (step 212) to decide whether or not the received data is addressed to his own station (step 213) and if the data is addressed to his own station, it operates to acquire the received data (step 214).

When the polling signal is not received at step 206, when there is no data to be transmitted at step 208, when data has been transmitted at step 209, when it is decided that transmitted data is not addressed to his own station at step 213, and when the received data has been acquired at step 214, then it is decided whether the frame at that time will finish or not (step 210). If the frame will not finish, processing returns to step 206 so as to wait for the polling signal from the control station. If it is decided that the frame will finish at step 210, processings in this frame are finished and then processings in the next frame will be repeated from step 201. In addition, when the operation to transmit data is performed at step 209, the data is transmitted only to the station which is decided to be capable of direct communication from this station based on the communication quality information received at step 204.

By processing in this way for wireless transmission, it will be possible, within the managing region at the head of every frame, to test the conditions of communication among the respective communicating stations, sum up the test result by the control station and control appropriately the wireless communication among regions, the respective communicating stations based on the totaled communication quality information. Furthermore, the totaled communication quality information is transmitted, in every frame, from the control station to all communicating stations and so each communicating station can find the station with which direct communication can be made, thus eliminating data transmission to the station with which no communication can be made.

Next, a second embodiment according to the present invention will be described with reference to FIG. 9 to FIG. 12. In FIG. 9 to FIG. 12 showing the second embodiment, parts corresponding to those of FIG. 1 to FIG. 8 described above on the first embodiment are denoted by the same reference numerals to omit their detailed description.

In this example, the configuration of network system is identical with the above described first embodiment. Thus, as is shown in FIG. 3, the system is comprised of seven wireless nodes WN1 to WN7 and one node WN4 (this node can communicate directly with all other stations) of them is the control station. Communications with other communicating stations are performed under the control of the control station.

In this context, when the nodes connected by a straight line as shown in FIG. 3 can make direct communication with one another among the nodes WN1 to WN7 with the network configuration shown in FIG. 3, if data is to be wirelessly transmitted among the communicating stations which cannot make direct communication with each other, the present example is arranged so that a relay station is specified to allow data to be transmitted on a relay transmission under the control of the control station.

Figure 9:
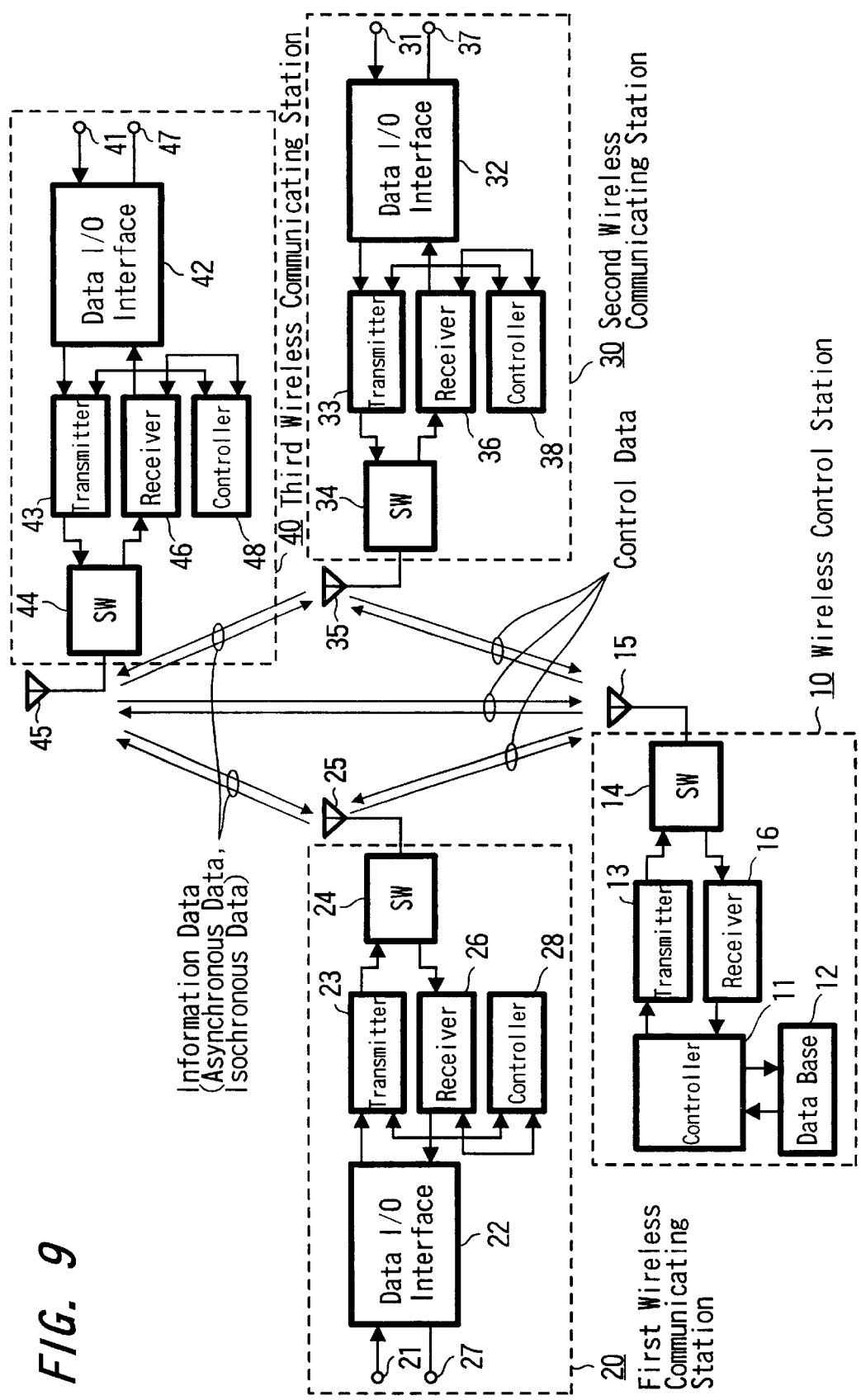
FIG. 9 is a block diagram showing the configuration of each communicating station and a control station according to a second embodiment of the present invention.

FIG. 9 shows an arrangement of the communicating stations of the present example where the relay transmission is performed. When the first wireless communicating station 20 and the second wireless communicating station 30 are in such a positional relationship that they cannot make direct communication with each other, a third wireless communicating station 40 is caused to relay the transmission. For instance, in the example of FIG. 3, it is considered that video data and audio data reproduced by the video disc player 3 connected to the wireless node WN3 are transmitted wirelessly once to the wireless node WN1, which relays to the wireless node WN2 on wireless transmission, thereby making the first monitor, or video receiver 2 connected to the wireless node WN2 to receive the data for display.

The first wireless communicating station 20 and the second wireless communicating station 30 forming a sender and a receiver have the same configuration as those of the first embodiment described referring to FIG. 1. The third wireless communicating station 40 to relay has also the same configuration as those of the first and second communicating stations 20, 30 basically. Thus, the third wireless communicating station 40 has a data I/O interface unit 42 which processes data received at an input terminal 41 to convert it into data for transmission and supplies the processed data to a transmitter unit 43 which processes it to make a transmitting signal. The transmitting signal is supplied to an antenna 45 through a change-over switch 44 for transmitting by wireless.

Also, a wireless signal received by the antenna 45 is supplied through the change-over switch 44 to a receiver unit 46 which operates to demodulate it into received data. The received data is supplied to the data I/O interface unit 42 which converts it to serial data of predetermined format or the like for outputting from an output terminal 47.

The configuration described so far is the same as those of other wireless communicating stations. However, in case of the station which is capable of the relay transmission, the data I/O interface unit 42 includes a buffer memory for storing once the data supplied to the interface unit 42 after being processed to receive by the receiver unit 46. The interface unit 42 has a function that, when a timing has come when one's own station is to transmit due to the polling signal and the like, the interface unit returns the received data stored in the buffer memory to the transmitter 43 which processes it for wirelessly transmitting to the destination from the antenna 45. Further, the station which is capable of the relay transmission is not limited to a particular station and all stations within the network system may be configured so that they can relay.

In case of the above-mentioned configuration, processings when data (asynchronous data or isochronous data) is relayed from the first wireless communicating station 20 to the third wireless communicating station 40 from where the data is transmitted to the second wireless communicating station 30 will be described below.

First of all, in this example, data is transmitted on the frame structure established under the control of the control station in the same way as the first embodiment. In other words, as shown in FIG. 10A, the managing region is provided in each frame and the remaining section is used as the data transmitting rigion.

FIG. 10B shows details of the managing region. From the head of the region, the frame synchronizing signal, the test signal, the test result information, the communication quality information, the system parameters an relay information are transmitted sequentially. In this regard, the frame synchronizing signal, the communication quality information, the system parameters and the relay information are signals which are transmitted from the wireless control station 10. Each wireless communicating station decides the frame cycle by receiving the frame synchronizing signal.

During sections of the test signal and the test result information, there are transmitted corresponding signals from other wireless communicating stations in a predetermined order. The control station produces the communication quality information based on the test result information and transmits it to each communicating station. These test signal, test result information and communication quality information are transmitted in the identical manner as the aforesaid first embodiment.

During the section of system parameter is transmitted information on various parameters, there of the network system from the control station to each communicating station. In the communicating station except the control station, when receiving those system parameters, its controller sets various items indicated by those parameters in the corresponding states.

In this example, the relay information is further transmitted after the system parameters and by this relay information the communicating station which plays the relay part is specified. In the communicating station side specified by the relay information, when a data transmission requiring to be relayed occurs, the controller unit of that station performs the corresponding control of processing so that it may operate as the relay station.

When the so far described managing origin has finished, the remaining section within one frame turns into the data transmitting region. In the data transmitting region, data (asynchronous data or isochronous data) is transmitted among the communicating stations under the control of the control station. In case of the present example, communications among the stations take place under the polling control of the control station. Processings for communication under the polling control are the same as those described referring to FIG. 5 on the above-mentioned first embodiment. In addition, when each communicating station intends to transmit by wireless on the relay transmission, its controller unit decides the relay station based on the relay information transmitted from the control station to transmit wirelessly regarding the relay station as a direct destination, and adds on that occasion also information indicating that this is the relay transmission as well as information on the final destination after being relayed when transmitting.

Figure 11:
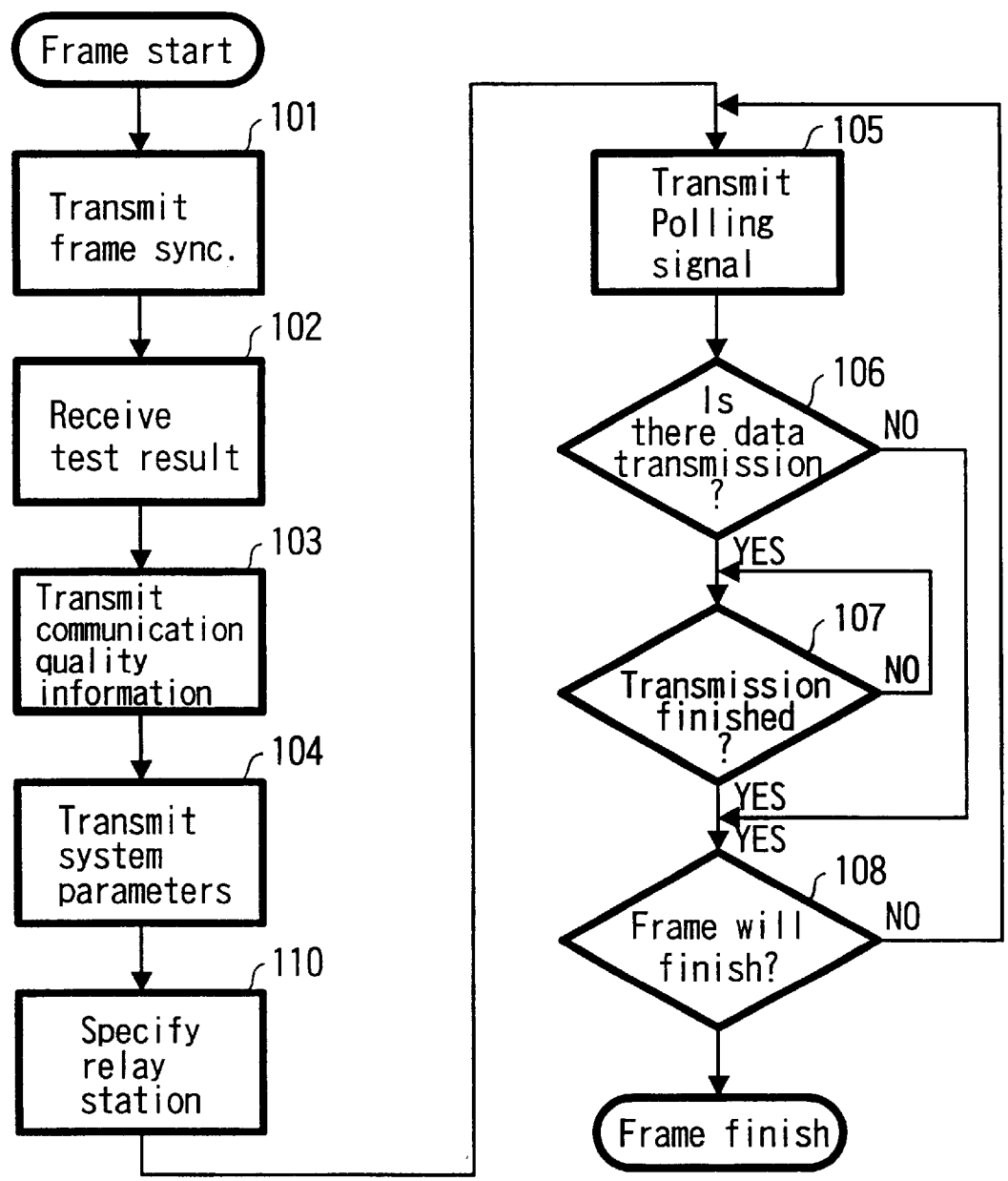
FIG. 11 is a flow chart showing the processings in the control station according to the second embodiment of the present invention.
Figure 12:
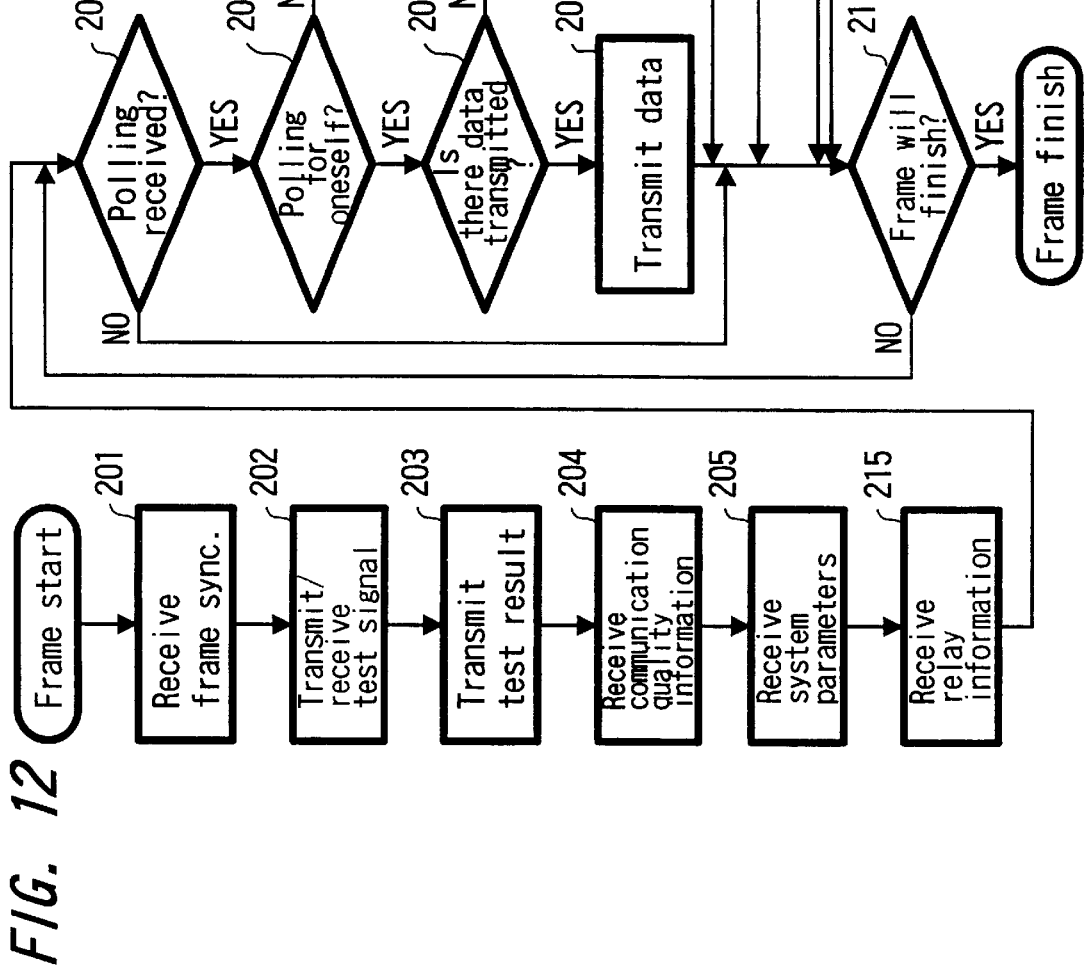
FIG. 12 is a flow chart showing the processings in the communicating station according to the second embodiment of the present invention.

Next, processings performed by the control station and the communicating station in every frame cycle when the relay transmission is enabled with the frame structure for the present example will be described below with reference to flow charts of FIG. 11 and FIG. 12. Processings performed by the control station will be described first based on the flow chart of FIG. 11. At the head of one frame, the control station operates to transmit the frame synchronizing signal (step 101). The control, station waits during the test signal section, i.e. a section next to the frame synchronizing signal, receives the test result information (step 102) transmitted during the next test result information section, sums up the received test result information to produce the communication quality information, and transmits the produced communication quality information (step 103). Next, the control station operates to transmit the system parameters during the system parameter section (step 104) and further operates to transmit information on specifying the relay station (step 110), thus completing processings in the managing region.

Processings in the data transmitting region are basically the same as those of the embodiment described above referring to the flow chart of FIG. 6. Specifically, the control station operates to transmit the polling signal (mediating signal) for calling in turn each communicating station (step 105) and decides whether or not there is a data transmission from a corresponding station by transmitting the polling signal (step 106). If there is the data transmission, it decides whether the transmission has finished or not (step 107). If the data transmission has finished or it is decided that there is no data transmission at step 106, then it decides whether or not the data transmitting region of this frame will finish (step 108). If the data transmitting region will not finish, the processing returns to step 105 for transmitting the polling signal to the next station. If it decides that the data transmitting region of this frame will finish, processings in this frame are finished and then processings in the next frame will be repeated from step 101.

Next, processings performed in each frame by the communicating station in the present example will be described with reference to the flow chart of FIG. 12. When receiving the frame synchronizing signal (step 201), the communicating station operates to transmit/receive the test signal at a timing established by the frame synchronizing signal (step 202) and operates to transmit the test result information indicating a result of receiving the test signal (step 203). Subsequently, it operates to receive the communication quality information (step 204) during the section where the communication quality information is transmitted, operates to receive the system parameters (step 205) during the section where the system parameters are transmitted, and operates to receive the relay information (step 215) during the section where the relay information is transmitted. Next, the communicating station decides whether the polling signal is received or not (step 206). If the polling signal is received, it decides whether the polling signal is addressed to one's own station or not (step 207). If the signal is addressed to his own station, it decides whether or not there is any data to be transmitted from his own station (step 208). If there is data to be transmitted, it operates to transmit that data (step 209).

If at step 207 it is decided that the polling signal is not addressed to his own station, the communicating station receives data transmitted from each communicating station (step 212), decides whether or not the received data is addressed to his own station: (step 213), and operates to acquire the received data (step 214) if that data is addressed to his own station.

If at step 213 it is decided that data is not for his own station, the communicating station decides whether the data is to be relayed or not (step 216) and if the data is to be relayed, it causes the buffer memory for storing transmitted data to store the received data (step 217).

When the polling signal is not received at step 206, when there is no data to be transmitted at step 208, when data has been transmitted at step 209, when the received data has been acquired at step 214 and when it is decided that data is not to be relayed at step 216, the communicating station decides whether the frame at that time will finish or not (step 210) and if the frame will not finish, it returns to step 206 and waits for the polling signal from the control station. If it is decided that the frame will finish at step 210, processings in this frame are finished and then processings in the next frame will be repeated from step 201. In addition, the data stored in the buffer memory at step 217 is processed to be transmitted at step 209 after it is decided that the polling signal is addressed to his own station at step 207.

The processings to transmit by wireless in this manner will make it possible, like the case of first embodiment, within the managing region at the head of every frame, to test conditions of communication among the respective communicating stations, sum up the test result by the control station and control wireless communication among respective the communicating stations appropriately based on the totaled communication quality information. At the same time, if it is found that there are stations which cannot make direct communication with one another from the communication quality information at that time, data is securely transmitted among the respective communicating stations on the relay transmission, thus ensuring data transmission within the network system to be performed.

Further, having described here the example in which a single station relays once, a relay transmission over long distance may be enabled by relaying a plurality of times.

In addition, having described above the embodiments in which data transmission from each communicating station is performed by polling, with regard to the method in which the data transmission is performed, other methods may be employed.

While the above described embodiments are arranged so that the managing region is provided at the head of one frame and the test signal, the test result information and the communication quality information are transmitted in the managing region at the head of one frame, these signals may be transmitted in other section within one frame. Also, the order in which the respective signals are arranged within the managing region is not limited to the aforesaid example. Again, regarding the test signal and the test result information, while it is arranged that the test among all communicating stations within the network system can be made in one frame, the test may be made over a plurality of frames. For example, it may be arranged that, during the test signal section within one frame, only one communicating station within the system transmits the test signal and makes other communicating stations decide the test result and transmit the result from the stations, thus making a piece of communication quality information to be produced over the number of frames corresponding to the number of the communicating stations.

Furthermore, instead of deciding the communication quality in every frame, the test signal and the test result information may be transmitted at every predetermined frame for deciding. In other words, the test signal and the test result information may be transmitted, e.g. once per dozen frames and in other frame period the test signal and the test result information from each communicating station may be stopped from being transmitted.

Moreover, while in the aforesaid embodiments the decision of communication quality is made in two stages of whether communication is possible or not, the decision may be made in more stages for obtaining the more detailed test result information from a result of the decision.

Furthermore, while each communicating station detects the received power data, the likelihood data and the error correction rate data to decide the receptive condition from the respective data, it will be possible to decide the receptive condition by detecting only at least any one of those data.

According to the first wireless communication method, each communicating station can find the quality of communication with other communicating stations within the system by receiving the test signal and decide conditions of communication within the system by making the communication quality information among the respective communicating stations to be produced on the basis of the quality of communication and transmitting it to each communicating station. Therefore, it will be possible to ensure wireless transmission within the system by transmitting wirelessly to the only companion which is decided to be in good conditions of communication.

According to the second wireless communication method, in dependence on the first wireless communication method, each communicating station receives the test signal transmitted from other communicating stations, produces the test result from the receptive condition and transmits the test result, thereby allowing the communication quality information to be satisfactorily produced based on the result of actual transmission as well as allowing the control station to sum up satisfactorily the communication quality information.

According to the third wireless communication method, in dependence on the second wireless communication method, the control station receives the test result transmitted from each communicating station, holds it and transmits the communication quality information based on the test result to each communicating station, thereby enabling each communicating station also to grasp conditions of communication with other stations.

According to the fourth wireless communication method, in dependence on the third wireless communication method, when the communicating station capable of direct communication is determined by the test result, if there is any request for data transmission among the communicating stations which are determined to be incapable of direct communication, the control station specifies the relay communicating station during its access control to process for the relay transmission, thereby allowing also wireless transmission between the communicating stations within the system which are incapable of direct communication to be performed satisfactorily on the relay transmission according to instructions of the control station.

According to the first wireless communicating apparatus, wireless communication with other wireless communicating apparatuses is performed in the frame cycle and in the managing field within the frame cycle and the quality of communication with other wireless communicating apparatuses can be checked based on the test signal and the test result can be transmitted to the control apparatus or the like.

According to the second wireless communicating apparatus, because, in dependence on the first wireless communication apparatus, it comprises the test result generator unit for generating the test result from at least one of the receptive intensity when the communication processor unit receives the test signal, the degree of data error and the likelihood of error correction, it will be possible to generate satisfactorily the test result on the bases of conditions of actual communication.

According to the third wireless communicating apparatus, because, in dependence on the first wireless communication apparatus, the communication processor unit transmits or receives the isochronous data or the asynchronous data in the data transmitting region under the control of the controller unit among other wireless communicating apparatuses, wireless transmission of the isochronous data or the asynchronous data can be well performed.

According to the fourth wireless communicating apparatus, because, in dependence on the third wireless communication apparatus, the communication processor unit receives the communication quality information transmitted in the managing region from the control apparatus, the controller unit decides the communication quality information received to determining other wireless communicating apparatuses capable of direct communication, and the controller unit causing the communication processor unit to communicate directly with only the other wireless communicating apparatuses capable of direct communication, direct transmission to the apparatus within the system which is incapable of direct communication will be eliminated and so wireless transmission without causing transmission error is ensured.

According to the first wireless communication control apparatus, the communication quality information representative of conditions of communication among the respective wireless communicating apparatus under the control of this control apparatus is transmitted in the managing region within the frame cycle and each wireless communicating apparatus can grasp the communication condition within the communication network, thereby allowing sure transmission, because transmission conditions are grasped, to be performed when each wireless communicating apparatus transmits by wireless.

According to the second wireless communication control apparatus, because, in dependence on the first wireless communication control apparatus, the transmitter unit transmits in the data transmitting region a signal for the access control of communication among the plurality of wireless communicating apparatus, it will be possible to ensure wireless transmission among the respective communicating apparatus under the control of this control apparatuses by the access control signal.

According to the third wireless communication control apparatus, when there is any wireless communicating apparatus which is decided to be incapable of direct communication from the test result, in the first wireless communication control apparatus, the transmitter unit transmits information for specifying a wireless communicating apparatus to be the relay station, thereby enabling the control processing of relay transmission to be well performed on the basis of the grasped conditions of communication within the communication network.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A wireless communication method wherein a control station controls access to wireless communication among a plurality of communicating stations, comprising the steps of:

transmitting wireless signals of a frame structure by wireless communication under control of said control station, said frame structure of said wireless signals including a managing region and a data transmitting region;

transmitting, in said managing region, test signals for checking a quality of communication among said plurality of communicating stations and for checking communication quality information representative of said quality of communication among said plurality of communicating stations; and transmitting, in said data transmitting region, one of isochronous data and asynchronous data under said control of said control station.

2. The wireless communication method according to claim 1, further comprising the steps of:

receiving, by each of said communicating stations, a test signal transmitted from a communicating station;

producing, by each of said communicating stations, a test result from receptive conditions of said test signal; and transmitting, by each of said communicating stations, said test result.

3. The wireless communication method according to claim 2, further comprising the steps of:

receiving, by said control station, said test result transmitted from each of said communicating stations;

holding, by said control station, said test result; and transmitting, by said control station, said communication quality information based on said test result to each of said communicating stations.

4. The wireless communication method according to claim 3, further comprising the steps of:

determining, by said control station, said communicating stations capable of direct communication based on said test result transmitted from each of said communicating stations;

specifying, by said control station during said control, a relay communicating station if a transmission request for one of said isochronous data and said asynchronous data is made between said communicating stations determined to be incapable of direct communication; and retaining temporarily, by said relay communicating station, one of said isochronous data and asynchronous data under said control of said control station.

5. A wireless communicating apparatus wherein wireless communication with other wireless communicating apparatuses is performed under access control of a predetermined control apparatus, said wireless communicating apparatus comprising:

a controller for controlling a communication in a frame cycle established by said control apparatus; and a communication processor for transmitting/receiving, under control of said controller, in a managing region established in a first timing section within said frame cycle, a test signal for checking a quality of communication with said other wireless communicating apparatuses, and a test result based on said test signal.

6. The wireless communicating apparatus according to claim 5, further comprising a test result generator for generating said test result from at least one of a receptive intensity when said communication processor receives said test signal, a degree of data error, and a likelihood of error correction.

7. The wireless communicating apparatus according to claim 5, wherein said communication processor transmits/receives, under said control of said controller, in a data transmitting field established in a second timing within said frame cycle, one of isochronous data and asynchronous data to/from said other wireless communicating apparatuses.

8. The wireless communicating apparatus according to claim 7, wherein:

said communication processor receives communication quality information transmitted from said control apparatus in said managing region; and said controller analyzes said communication quality information, determines said other wireless communicating apparatuses capable of direct communication, and causes said communication processor to communicate directly with only said other wireless communicating apparatuses determined to be capable of direct communication.

9. A wireless communication control apparatus for controlling access to wireless communication among a plurality of wireless communicating apparatuses, said control apparatus comprising:

a controller for causing said wireless communication among said plurality of wireless communicating apparatuses to be performed in a frame cycle, for establishing a managing region in a first timing within said frame cycle and for establishing a data transmitting region in a second timing;

a receiver for receiving, in said managing region, information transmitted from each of said wireless communicating apparatuses and representative of a test result of conditions of communication with other wireless communicating apparatuses;

a transmitter for producing communication quality information from a result of a determination by said controller determining received information representative of said test result and for transmitting produced communication quality information in said managing region.

10. The wireless communication control apparatus according to claim 9, wherein said transmitter transmits signals for access control of said wireless communication among said plurality of wireless communicating apparatuses in said data transmitting region.

11. The wireless communication control apparatus according to claim 9, wherein, if there are any of said wireless communicating apparatuses determined to be incapable of direct communication from said test result, said transmitter transmits information for specifying a wireless communicating apparatus forming a relay station.

* * * * *